Sept. 9, 1947.  J. C. CROWLEY  2,427,199
GAUGE
Filed Jan. 5, 1944
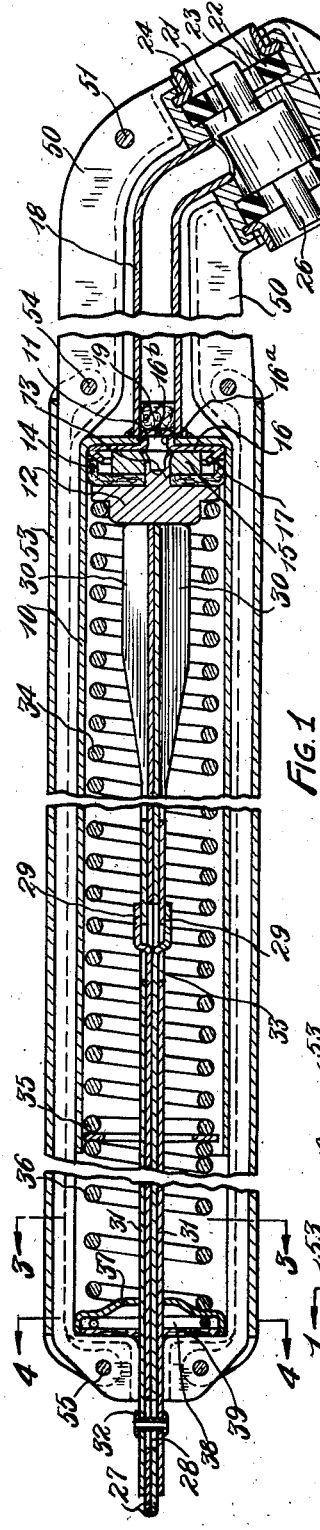
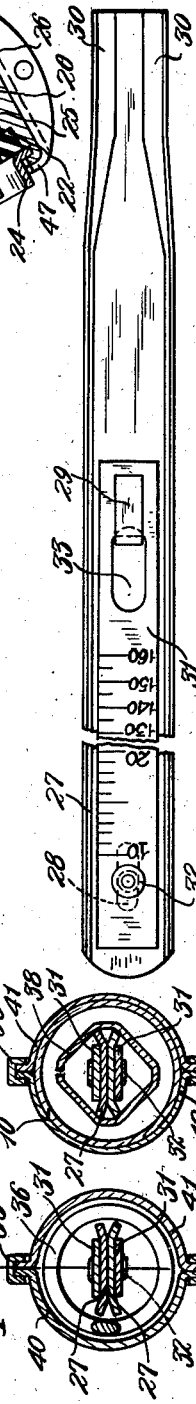
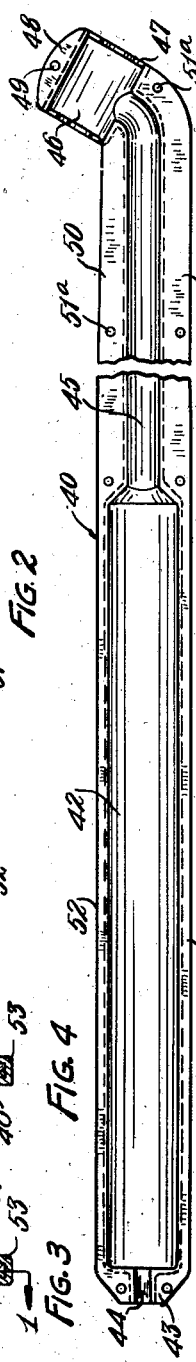
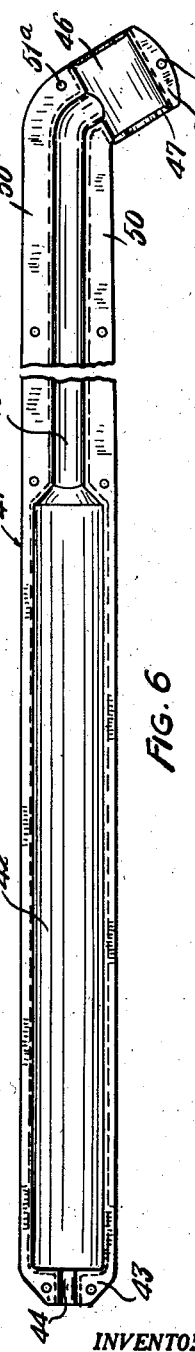
INVENTOR.
JOHN C. CROWLEY
BY Kuis Hudson, Boughton & Williams
ATTORNEYS Patented Sept. 9, 1947

2,427,199

UNITED STATES PATENT OFFICE 2,427,199

GAUGE

John C. Crowley, Cleveland Heights, Ohio, assignor to The Dill Manufacturing Company, Cleveland, Ohio, a corporation of Ohio Application January 5, 1944, Serial No. 517,127

18 Claims. (Cl. 73—419)

1

This invention relates to an improved and novel fluid pressure gauge and particularly to a gauge which can be used to determine the pressures existing in pneumatic tires and in other inflatable articles.

The principal object of the invention is to provide a fluid pressure gauge which while efficient is of maximum simplicity and is constructed of a minimum number of parts which can be readily and economically manufactured and assembled.

Another important object is to provide a fluid pressure gauge which utilizes in its construction a minimum amount of copper and other non-ferrous metals.

A further object is to provide a fluid pressure gauge that can be constructed in large part of metal stampings and therefore is particularly adapted for large scale economic production and requires a minimum number of screw machine produced parts.

Another and important object is to provide a fluid pressure gauge which can be assembled and while assembled tested and then adjusted accurately from exteriorly of the gauge housing, thereby obviating the usual practice now followed of disassembling the gauge after testing to adjust the same and then reassembling the tested and adjusted gauge.

A more specific object is to provide a fluid pressure gauge, the housing of which is formed of two main stamped or molded one-piece sections which when assembled cover and protect the operative parts of the gauge and particularly those formed of non-ferrous metals and therefore such parts need not be large in size for purposes of strength.

Another specific object is to provide a fluid pressure gauge the housing of which is formed of two main stamped or molded one piece sections which are held together by elongated strap-like members that seal the housing and also furnish a hand grip portion for the user of the gauge.

A still further object is to provide a fluid pressure gauge which has an indicator bar that can be simply and economically produced, can be formed of stamped or extruded material and is provided with integral guide portions in place of the usual tubular machined guiding element.

Further and additional objects and advantages not hereinbefore specified will become apparent during the following detailed description of an embodiment of the invention. Referring to the accompanying drawing illustrating such embodiment of the invention,

2

Fig. 1 is a longitudinal sectional view through the gauge and is taken substantially on line 1—1 of Fig. 3 looking in the direction of the arrows.

Fig. 2 is a detached plan view of the assembled indicator bar of the gauge.

Figs. 3 and 4 are transverse sectional views through the gauge on a smaller scale than Fig. 1 and are taken respectively along lines 3—3 and 4—4 of Fig. 1 looking in the direction of the arrows.

Figs. 5 and 6 are inside plan views respectively of the two complementary main one piece housing sections of the gauge.

The fluid pressure gauge of the illustrated embodiment comprises a tubular shell member 10 which is open at one end (its left hand end as viewed in the drawing) while its other or right hand end is closed except for a central opening 11. The shell 10 is preferably formed of suitable non-ferrous metal as, for example, brass and may be produced by a drawing operation. The gauge piston is mounted in the shell 10 and said piston includes a plunger member 12 which may be formed of a suitable non-ferrous metal and is provided on its right hand face as viewed in the drawing with a centrally located axially extending pin 13. A suitable cup-shaped flexible plunger gasket 14 is mounted on the right hand face of the plunger 12 and is held in position by a washer 15 secured thereagainst by the riveted or upset outer end of the pin 13. The walls of the cup-shaped gasket 14 have air sealing sliding engagement with the inner surface of the tubular shell 10.

A gasket spreading plug 16 interfits the interior of the shell 10 and is secured in position therein and said plug is provided with a central depression 16a extending through the opening 11 in the end of the shell 10 and said depression is provided with a small opening 16b. The circumference of the plug 16 is provided with an annular inclined or conical flange 17 which when the piston is in its most right hand position in the shell 10 engages the wall of the gasket 14 and maintains said wall in tight engagement with the interior of the shell and thereby prevents the walls of the gasket from collapsing inwardly when not subjected to fluid pressure.

A length of tubing 15 of small cross-sectional size and formed of a non-ferrous material, such as copper, has its left hand end, as viewed in the drawing, telescoping the depression 16a and contacting the closed end of the shell 10 and secured thereto by suitable means such as by soldering.

A suitable filter 19 is mounted in the left hand end of the tubing 18 and this filter is formed of felt or other suitable filtering material through which fluid can pass. The tubing 18 adjacent its right hand or outer end is angularly bent, as indicated, and projects into an opening formed in a cylindrical chuck head 20 which is made of a non-ferrous material such as brass for example. The right hand or outer end of the tubing 18 is fixedly secured to the chuck head 20 and communicates with a central bore 21 formed in said chuck head.

The bore 21 in the chuck head 20 communicates at its opposite ends with counterbores in which are mounted chuck washers 22 formed of suitable material such as natural or synthetic rubber and each provided with a central opening 23. The chuck washers 22 are held in position in the chuck head 20 by sleeve-like washer retaining elements 24, the inner ends of which are outwardly flanged and interfit counterbores in the opposite ends of the chuck head 20 and are held tightly in position therein by inwardly flanging the opposite ends of the chuck head 20, as clearly shown in Fig. 1 and as will be well understood in the art. A cylindrical block 25 floats in the bore 21 of the chuck head and is provided on its opposite ends with outwardly extending pins 26 which pass through the openings 23 in the washers 22 and have their outer ends located within the sleeve-like members 24. As is well understood in the art when the chuck head is applied to a valve stem one or the other of the pins 26, depending upon which side of the chuck head is used, will engage the valve pin of the valve mechanism in the valve stem and will depress said pin to open the valve. It will also be understood that the end of the valve stem will sealingly engage the outer side of one of the washers 22 while the block 25 will sealingly engage the inner side of the other washer 22 and that therefore fluid can pass through the valve stem from the tire or other inflated article into the bore 21 of the chuck head and thence through the tubing 18 and the central opening 16b in the spreading plug 16 to the interior of the shell 10, wherein it will create pressure on the piston to move the same from the right hand end of the shell, as viewed in the drawing, toward the left hand end thereof.

The indicator bar comprises two superimposed metal bars 27 of suitable length and which bars are rigidly secured together by suitable means as, for instance, by spot welding. These bars may be plated if desired after they have been spot welded together. The bars 27 adjacent one end are provided with elongated registering slots 28 for a purpose later to be explained, while intermediate their ends they are provided with struck-out longitudinally extending tabs 29 for a purpose later to be explained. The bars 27 adjacent the end thereof which is located inwardly of the gauge are provided with divergent outwardly projecting longitudinally extending flanges or wings 30 and said wings act to guide the movement of the indicator bar in the gauge, and particularly within the gauge spring later to be referred to. In other words, the flanges or wings 30 take the place of the usual tubular machined guiding element that heretofore has been necessary in gauges of this character. The right hand end of the wings or flanges 30 as viewed in Fig. 1 contact the plunger member 12 of the piston and act to stabilize the indicator bar relative to the piston and particularly during movement of the piston in the cylinder.

Graduated indicator scales 31 are secured to the outer surface of each bar 27 and these scales are of less length than the bars. The scales are graduated and bear indicia ranging from low pressures up to substantially high pressures, as, for example, from ten pounds pressure to one hundred and sixty pounds pressure, as will be understood in the art.

A rivet 32 extends through the scales 31 and the elongated registered slots 28 in the outer ends of the bars 27 and after the scales have been adjusted, following the testing of the gauge, this rivet is tightly upset to hold the scales firmly in adjusted position on the bars 27, as will later be explained.

The scales 31 are provided with elongated slots 33 through which extend the tabs 29 of the bars 27, with the inner side of the tabs engaging the outer side of the scales as clearly shown in Fig. 1. The bars 27 outwardly of the flanges or wings 30 have their longitudinal edge portions slightly divergently flared as clearly indicated in Figs. 3 and 4. The indicator bar assembly when mounted in the gauge has its inner end which is provided with the wings or flanges 30 engaging the piston 12 as clearly shown in Fig. 1, wherefore movement of the piston toward the left results in a corresponding movement of the indicator bar as a unit.

A low pressure coil spring 34 is mounted in the shell 10 and surrounds the indicator bar and has its inner end engaging the shoulder of the piston plunger 12 while its outer end abuts a ring washer 35 mounted in the shell 10. A high pressure coil spring 36 surrounds the indicator bar and has its inner end abutting the ring washer 35 while its outer end engages with a cup-shaped retaining member 37 having a central guiding opening through which the indicator bar slides. The retaining member 37 may be stamped from suitable sheet metal and houses one or more split polygonally shaped wire springs 38 which contact the flared longitudinal edges of the bars 27 of the indicator bar and act to frictionally hold said indicator bar in the position to which it has been moved by the movement of the piston. A suitable packing disk of felt or other material through which the indicator bar extends is indicated at 39 and said disk is housed in the cup-shaped retaining member 37 and may be impregnated with a suitable lubricant if desired. This packing disk prevents dirt entering the interior of the gauge and exerts a wiping action on the indicator bar as it moves inwardly or outwardly through it.

The parts of the gauge already referred to are mounted within a housing which will now be described. This housing preferably is formed of two complementary parts 40 and 41 with each part preferably formed of a single piece of material. The housing parts 40 and 41 can be stamped from sheet metal as shown, or if desired, such parts could be molded from suitable plastic material. The housing parts comprise handle portions which are provided with semi-circular recesses 42 which when the parts are assembled together form a substantially cylindrical chamber in which are housed the shell 10, the springs 34 and 36 and the retaining member 37 and its associated parts. The housing parts 40 and 41 at their left hand end, as viewed in the drawing, are provided with outwardly extending flanges 43 having formed therein depressed channels 44, wherefore when the housing parts are secured together the indicator bar can extend outwardly of the housing through the space provided by the channels 44 and is held against turning movement in the housing by the walls of said channels which act to guide the indicator bar in its endwise movements.

The housing parts 40 and 41 are extended from the inner or right hand end of the handle portions and such extensions are provided with centrally located longitudinally extending semi-circular grooves 45 When the housing parts are assembled together these grooves 45 constitute a cylindrical recess which receives the tubing 18. The right hand ends of the housing parts 40 and 41 are angularly disposed and are provided with semi-circular recesses 46. When the housing parts are assembled together the recesses 46 provide a chamber which houses the chuck head 20, it being noted that the housing parts at each end of the recesses 46 are inwardly flanged as indicated at 47. The extreme right hand ends of the housing parts 40 and 41 as viewed in the drawing are provided with outwardly extending flanges 48 which when the parts are assembled engage each other and can be locked together by a rivet or other suitable securing means extending through aligned openings 49 in said flanges. The parts 40 and 41 on each side of the channels 45 are provided with cooperating flanges 50, which when the parts are assembled together can be secured in tight engagement with each other by rivets or other suitable means 51 passing through aligned openings 51a in the flanges 50. The flanges 50 merge into the narrow flanges 52 on each side of the handle portion of the housing, and said flanges 52 in turn merge with the flanges 43 at the left hand end of the housing.

When the housing parts are assembled together suitable strap-like channel members 53 fit over the engaging flanges 52 of the housing parts as clearly indicated in Figs. 3 and 4. These strap-like members at their right hand ends are each provided with an inwardly extending forked portion which straddles an opening in the flanges 50, wherefore the right hand ends of the strap-like members can be secured in position by suitable securing means such as the rivets 54. The left hand ends of the strap-like members 52 are likewise provided with inward extending forked portions which straddle the flanges 43 and which are provided with openings that register with openings in the flanges 43, wherefore suitable securing means such as the rivets 55 can be employed to secure the left hand ends of the strap-like members in assembled position on the housing. The strap-like members 53 not only secure the handle portions of the housing together but they effectively seal the chamber in which the operative parts of the gauge are mounted. In addition, the strap-like members 53 also furnish hand grip facilities on the handle portions of the housing. Of course if desired these strap-like members could be extended along the flanges 50 to the chuck head of the gauge.

It will be noted that all of the parts of the gauge that are formed of non-ferrous metal including the tubing 18 are contained in and protected by the housing. Therefore, these non-ferrous parts do not have to be made large in size for purposes of strength as they are fully protected by the housing. This is particularly true with respect to the tubing 18 which ordinarily in gauges is exposed and therefore must be fairly large in cross-sectional size to give it sufficient strength to resist bending.

It will have been seen from the description heretofore set forth that this gauge is so designed as to require a minimum number of non-ferrous metal parts and that such parts can be relatively small in size, as strength is not a consideration since they are fully protected by the housing. In addition, it will have been noted that the number of parts of the gauge which must be produced by screw machine operations are maintained at a minimum and that the gauge can be largely constructed of parts produced by simple stamping operations. The facility with which this gauge can be assembled is readily recognizable from the description heretofore set forth. Consequently the gauge of the present invention can be economically and efficiently manufactured and particularly lends itself to quantity production methods.

A very important feature of the present gauge is that after the gauge has been assembled it can be tested for accuracy and the scales 31 then adjusted and secured on the bars 27 in the proper adjusted position without requiring the disassembly of the gauge. This adjustment of the scales is carried out in the following manner: The rivet 32 which secures the scales on the bars 27 is not completely upset prior to the testing of the gauge, wherefore the scales can be moved relatively to the bars 27 due to the slots 28 through which the rivet 32 extends and the slots 33 in the scales through which the tabs 29 extend. After the gauge is assembled the scales 31 are pushed inwardly relative to the bars 27 until the rivet is at the most right hand end of the slots 28. The gauge is then applied to a fluid pressure line having a known pressure and after the piston and the indicator bar have been moved outwardly by this pressure a reading is taken to see how much deviation there is between the indicated pressure and the actual and known pressure of the line. Assuming that there is a difference between the indicated pressure and the actual and known pressure the scales 31 are moved relative to the bars 27 until the scales indicate the actual and known pressure in the line. Then all that need be done is to upset the rivet 32 completely in order to lock the scales in final accurately adjusted position upon the bars 27.

Heretofore it has been necessary usually to disassemble the gauges in order to adjust the same after their initial testing. With the present gauge this necessity is obviated and therefore there is saved the time heretofore required for disassembling the gauges and then after testing reassembling them.

Although a preferred embodiment of the invention has been illustrated and described herein it will be understood that the invention is susceptible of various modifications and adaptations within the scope of the appended claims.

Having thus described my invention, I claim:

1. In a pressure gauge, a housing, a pressure responsive piston means within said housing, spring means resisting movement of said piston in one direction, means for subjecting said piston to fluid pressure to move it against said spring means, and an indicator movable by said piston and extending outwardly of said housing, said indicator including a supporting member, a scale member on said supporting member, and cooperating means on said members exteriorly of said housing rigidly connecting said members together after said gauge has been tested and said members adjusted relative to each other.

2. In a pressure gauge, a housing, a pressure responsive piston means within said housing, spring means resisting movement of said piston in one direction, means for subjecting said piston to fluid pressure to move it against said spring means, and an indicator movable by said piston and extending outwardly of said housing, said indicator including a supporting member, a scale member on said supporting member, and cooperating means on said members and exteriorly of said housing rigidly connecting said members together after said gauge has been tested and said members adjusted relative to each other and including a slot in one of said members and a securing element on the other of said members and extending through said slot.

3. In a pressure gauge, a housing, a pressure responsive piston means within said housing, spring means resisting movement of said piston in one direction, means for subjecting said piston to fluid pressure to move it against said spring means, and an indicator movable by said piston and extending outwardly of said housing, said indicator including a supporting member, a scale member on said supporting member, and cooperating means on said members and exteriorly of said housing rigidly connecting said members together after said gauge has been tested and said members adjusted relative to each other and including an elongated slot in said supporting member and a securing element carried by said scale member and extending through said slot.

4. In a pressure gauge, a housing, a pressure responsive piston means within said housing, spring means resisting movement of said piston in one direction, means for subjecting said piston to fluid pressure to move it against said spring means, and an indicator including an elongated bar member having its inner end adjacent said piston and its outer end projecting exteriorly of said housing, a scale member on and extending longitudinally of said bar member, and cooperating means on said members and exteriorly of said housing rigidly connecting said members together after said gauge has been tested and said members adjusted relative to each other.

5. In a pressure gauge, a housing, a pressure responsive piston means within said housing, spring means resisting movement of said piston in one direction, means for subjecting said piston to fluid pressure to move it against said spring means, and an indicator including an elongated member having its inner end adjacent said piston and its outer end projecting exteriorly of said housing, a scale member on and extending longitudinally of said elongated member, said members being provided interiorly of said housing with cooperating means connecting the members together for relative longitudinal sliding adjustment and exteriorly of said housing with cooperating means rigidly connecting said members together after said gauge has been tested and said members adjusted relative to each other.

6. In a pressure gauge, a housing, a pressure responsive piston means within said housing, spring means resisting movement of said piston in one direction, means for subjecting said piston to fluid pressure to move it against said spring means, and an indicator including an elongated member having its inner end adjacent said piston and its outer end projecting exteriorly of said housing, a scale member on said elongated member and extending longitudinally thereof, said members being provided interiorly of said housing with cooperating means connecting the members together for relative longitudinal sliding adjustment, one of said members being provided exteriorly of the housing with an elongated slot and the other of said members being provided with a rivet extending through said slot and rigidly connecting said members together.

7. In a pressure gauge, a cylinder having a closed end provided with a central opening, a piston movable in said cylinder and including a cup-shaped packing facing toward said closed end, a disk secured in said cylinder at the closed end thereof and having a central depression interfitting and extending through said opening and itself provided with a small opening, said disk having at its circumference a conical flange adapted to engage the inner side of the wall of said cup-shaped packing to maintain the same in engagement with the wall of said cylinder, and a tube having one of its ends telescoped upon said central depression and secured to the closed end of said cylinder, and a check head connected to the other end of said tube.

8. In a pressure gauge, an elongated cylinder open at one end and closed at the opposite end thereof, a piston operable therein, spring means extending into the open end of said cylinder and resisting movement of said piston in one direction, an indicator engaging said piston and extending outwardly of the open end of the cylinder, a chuck head spaced from the closed end of the cylinder, a tube interconnecting and in communication with said cylinder and chuck head, and a housing enclosing and protecting said cylinder, chuck head and tube and including two complementary one piece members secured together and providing at one end of the housing an opening through which said indicator extends and at the opposite end thereof an opening affording access to said chuck head.

9. In a pressure gauge, an elongated cylinder open at one end and closed at the opposite end thereof, a piston operable therein, spring means extending into the open end of said cylinder and resisting movement of said piston in one direction, an indicator extending outwardly of said open end of the cylinder and engaging said piston, a chuck head spaced from the closed end of said cylinder, a tube interconnecting and in communication with said chuck head and said cylinder, and a housing enclosing and protecting said cylinder, chuck head and tube and including two complementary one-piece members secured together, said members having cooperating portions which enclose and protect said cylinder and form a handle portion for the gauge and cooperating portions which enclose and protect said tube and said chuck head, said first mentioned cooperating portions of the housing providing an opening through which said indicator extends and said second named cooperating portions thereof providing an opening affording access to said chuck head.

10. In a pressure gauge, an elongated cylinder, open at one end and closed at the opposite end thereof, a piston operable therein, spring means extending into the open end of said cylinder and resisting movement of said piston in one direction, an indicator engaging said piston and extending outwardly of said open end of the cylinder, a chuck head spaced from the closed end of said cylinder, a tube interconnecting and in communication with said cylinder and said chuck head, and a housing including two complementary one piece members, said members having portions provided with semi-circular chambers which enclose and protect said cylinder when said members are secured together, said portions forming a gauge handle and providing an opening through which said indicator extends, said members also having portions extending from said first portions and provided with semi-circular channels and at their free ends with semi-circular recesses, said channels interconnecting said chambers and said recesses, said last named portions when said members are secured together enclosing and protecting said tube and said chuck head with said tube and chuck head located, respectively, in said channels and in said recesses, said last named portions being shaped to provide an opening affording access to said chuck head.

11. In a pressure gauge, an elongated cylinder open at one end and closed at the opposite end thereof, a piston operable therein, spring means extending into the open end of said cylinder and resisting movement of said piston in one direction, an indicator engaged by said piston and extending outwardly of the open end of said cylinder, a chuck head spaced from the closed end of said cylinder, a tube interconnecting and in communication with said chuck head and said cylinder and a housing enclosing and protecting said cylinder and including two complementary one-piece members secured together, said members having cooperating portions which enclose and protect said cylinder and shaped to provide an opening through which said indicator extends, said portions having laterally projecting longitudinally extending flanges on both sides of said portions with the flanges of one portion engaging the flanges of the other portion when said members are secured together, and channel-shaped strap-like members embracing said flanges and secured to said housing members, said strap-like members and said portions of the housing members constituting a handle for the gauge.

12. In a pressure gauge, an elongated cylinder, a piston operable therein, spring means extending into said cylinder and resisting movement of said piston in one direction, an indicator in engagement with said piston and extending beyond said one end of said cylinder, a chuck head spaced from the opposite end of said cylinder, a tube interconnecting and in communication with said cylinder and said chuck head and a housing including two complementary one-piece members enclosing and protecting said cylinder, chuck head and tube, said members being provided on their longitudinal edges and at their ends with outwardly extending flanges with the flanges of one member engaging the corresponding flanges of the other member when said members are assembled, and means for securing said flanges together said members being shaped to provide an opening through which said indicator extends and an opening which affords access to said chuck head.

13. In a pressure gauge, an elongated cylinder, a piston operable therein, a chuck head spaced therefrom, a tube interconnecting said chuck head and said cylinder, a housing enclosing and protecting said cylinder, chuck head and tube and including two complementary one-piece members secured together and providing an opening affording access to said chuck head, spring means extending into said cylinder and abutting said piston and also projecting from said cylinder and abutting one end of said housing, and an elongated indicator including a supporting member extending into said cylinder and engaging said piston, said housing having at said one end an opening through which said supporting member projects, a scale member mounted on said supporting member, and cooperating means carried by said members exteriorly of said housing rigidly connecting said members together after said gauge has been tested and said members adjusted relative to each other.

14. In a pressure gauge, a housing, a pressure responsive piston means within said housing, spring means resisting movement of said piston in one direction, means for subjecting said piston to fluid pressure to move it against said spring means, and an indicator movable by said piston and extending outwardly of said housing, said indicator including a supporting member, a scale member on said supporting member, one of said members interiorly of the housing being provided with an elongated longitudinally extending slot and the other of said members being provided with means extending through said slot and contacting a surface of said one member and acting to guide said members upon relative movement therebetween, one of said members exteriorly of said housing being provided with an elongated longitudinally extending slot and the other of said members being provided with a rivet extending through said slot and rigidly connecting said members together.

15. In a pressure gauge, a housing, a pressure responsive piston means within said housing, spring means resisting movement of said piston in one direction, means for subjecting said piston to fluid pressure to move it against said spring means, and an indicator movable by said piston and extending outwardly of said housing and including a supporting member and a scale member carried by said supporting member, one of said members interiorly of said housing being provided with an elongated longitudinally extending slot and the other of said members being provided with a tab extending through said slot and having a portion overlying said one member and contacting the same, said members exteriorly of said housing having cooperating means for rigidly connecting the members together and including an elongated longitudinally extending slot in one of said members and a rivet carried by the other of said members.

16. In a pressure gauge, a housing, a pressure responsive piston means within said housing, spring means resisting movement of said piston in one direction, means for subjecting said piston to fluid pressure to move it against said spring means, and an indicator movable by said piston and extending outwardly of said housing and including a supporting bar and scale members mounted on the opposite sides of said bar, said scale members being provided interiorly of said housing with elongated longitudinally extending slots and said bar being provided with tabs extending through said slots and having portions contacting the outer surfaces of said scale members, said bar being provided exteriorly of said housing with an elongated longitudinally extending slot and said scale members carrying a securing element extending through said latter slot and rigidly connecting said scale members and said bar.

17. In a pressure gauge, a cylinder, a piston movable therein, means for introducing pressure fluid to said cylinder to move said piston in one direction, a coil spring in said cylinder and resisting movement of the piston in said one direction, and an indicator movable by said piston and including an elongated member arranged within said coil spring and composed of superimposed bars secured together and provided with integral guide wings projecting divergently from the edges of said bars and extending longitudinally thereof and acting with said coil spring to guide said bars in their longitudinal movement in the cylinder, one end of said wings engaging said piston, and a scale member mounted on and connected to said bars.

18. A pressure gauge as defined in claim 17 and wherein said members are provided with cooperating means exteriorly of said housing which rigidly connect said members together after said gauge has been tested and said members adjusted relative to each other.

JOHN C. CROWLEY.

REFERENCES CITED

The following references are of record in the file of this patent:

UNITED STATES PATENTS

| Number | Name | Date |
|---|---|---|
| 1,774,153 | Pfeiffer | Aug. 26, 1930 |
| 1,894,648 | Wahl | Jan. 17, 1933 |
| 630,756 | Tierney | Aug. 8, 1899 |
| 2,012,540 | Marchus | Aug. 27, 1935 |
| 2,278,776 | Fowler | Apr. 7, 1942 |